March 6, 1928.
W. R. MALM
LUGGAGE CARRIER AND BUMPER
Filed May 31, 1927
1,661,486
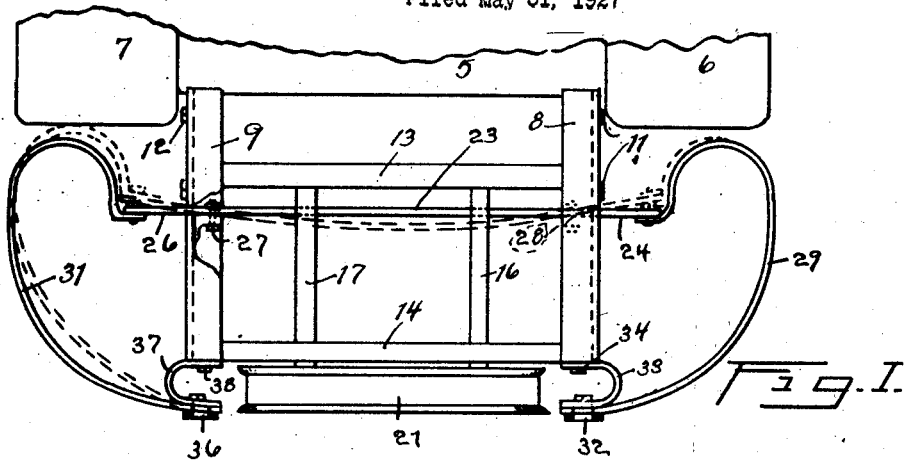
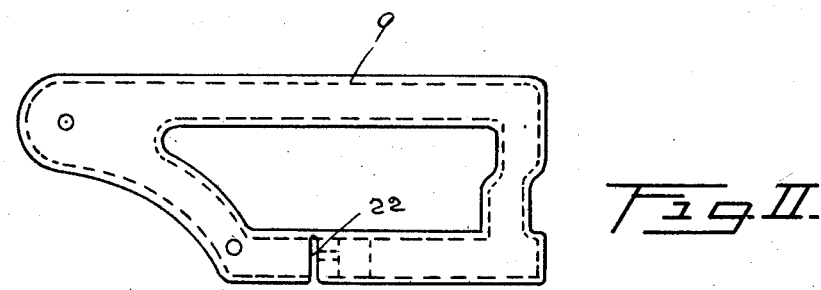
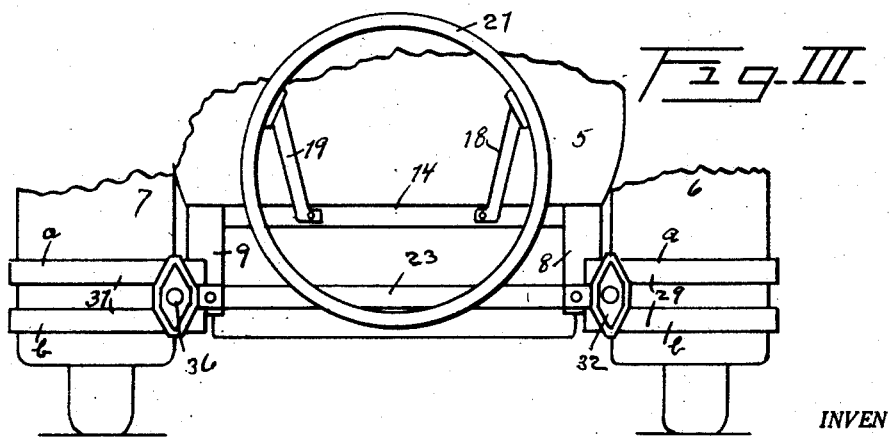
INVENTOR.
W. R. MALM
BY
ATTORNEY.

Patented Mar. 6, 1928.

1,661,486

UNITED STATES PATENT OFFICE.

WALTER R. MALM, OF SAN FRANCISCO, CALIFORNIA.

LUGGAGE CARRIER AND BUMPER.

Application filed May 31, 1927. Serial No. 195,428.

This invention relates to improvements in a combined luggage carrier and bumper for automobiles.

The principal object of this invention is to produce a luggage carrier having bumper tips secured thereto in such a manner that the same will be rigid under ordinary conditions but will be capable of flexing when struck so as to take up the shock incident to the contact.

Another object is to provide means whereby a relatively stiff bar transmits the shock from one bumper tip to the other thus equalizing the strain upon the whole device.

A further object is to construct a device of this character which is economical to manufacture.

A further object is to provide a device which is neat in appearance, and one which will not detract from the appearance of a motor vehicle upon which it is placed.

A still further object is to produce a device of this character which may be secured to any standard form of vehicle without materially altering the construction of the same.

Other objects and advantages will be apparent during the course of the following description.

In the accompanying drawings forming a part of this specification, and in which like numerals are employed to designate like parts throughout the same, Figure I is a top plan view of my device, Figure II is a side elevation of one of the supporting frames, and Figure III is a rear elevation of Figure I.

It has been common practise to secure a luggage carrier upon the rear of a motor vehicle and to attach wing tips to the luggage carrier, the purpose of which wing tips was to absorb the shock incident to a collision.

Due to the short length of the wing tips their construction was such that after being struck, they were apt to be bent and therefore they would not return to their normal position. This was due to the fact that the entire shock must of necessity be absorbed by the single wing tip.

I have provided means whereby the shock upon the wing tip is transmitted and dissipated over the entire luggage structure and also the wing tip upon the other side of the vehicle.

In Figure I, the numeral 5 designates the rear of a motor vehicle having rear fenders 6 and 7. To the rear of the vehicle are attached frames 8 and 9 as by bolts 11 and 12, respectively.

It is of course obvious that these frames may be secured to the vehicle in any well known manner.

The frames 8 and 9 are connected by cross pieces 13 and 14 between which are braces 16 and 17. These braces serve to support brackets 18 and 19, respectively upon which the usual rim carrier 21 is secured.

The structure thus far described is common to many forms of luggage carriers now upon the market.

The frames 8 and 9 are slotted as shown at 22 (see Figure II) which slots permit the placing of a bar 23 there-through so as to have its ends project on opposite sides of the carrier as shown at 24 and 26.

This bar 23 is made of relatively heavy material, such as would be employed in making vehicle springs and is bolted as shown at 27 and 28 to the frames 8 and 9, the frame 9 being broken away in Figure I so as to better illustrate this manner of connecting the bars thereto.

The wing tips 29 and 31 are secured to the bar 23, the wing tip 29 having one of its ends secured to the end 24, while its opposite end is secured by a clip 32 to a U-shaped spring member 33 which is in turn bolted as at 34, to the frame 8.

The tip 31 has one end secured to the end 26 of the bar 23, while its opposite end is secured by a clip 36 to a U-shaped spring member 37 bolted as at 38 to the frame 9.

The tips 29 and 31 are preferably constructed of parallel members $a$ and $b$, as is common practise (see Figure III).

The result of this construction is that when a collision occurs and for instance, when the tip 31 the blow will cause the contacts the tip 31 the blow will cause the tips to flex as shown in Figure I, which flexing will cause the bar 23 to also flex which will further transmit motion to the end 24 connected to the tip 29. Movement of the end 24 will be resisted by the tip 29 which of course assists in the absorption of the blow.

As the bar 23 is connected as at 28 and 27, to the frames 8 and 9, it will of course be obvious that the blow will be gradually dissipated throughout the luggage carrier as a whole.

There will also be certain movement of the spring members 33 and 37 which will further assist in the absorption of the shock with the result that the wing tips will in most instances return to their normal position after the collision has occurred.

It will thus be seen that I have produced a very simple arrangement consisting primarily of a bar extending entirely across the luggage carrier and secured thereto, which bar serves to transmit shock from one tip to the other and to the carrier as a whole.

It is to be understood that the form of my invention herewith shown and described is to be taken as a preferred example of the same, and that various changes relative to shape, size, material and arrangement of parts may be resorted to without departing from the spirit of the invention, or the scope of the subjoined claims.

Having thus described my invention, I claim:—

1. In combination with a luggage carrier having a pair of parallel frame members, a bar extending between said frame members and having its extremities projecting beyond said frame members, wing tips secured to the opposite ends of said bar and having their free ends secured to said frames at points remote from said bar.

2. In combination with a luggage carrier having a pair of spaced parallel frame members, said frame members having slots formed therein, a bar extending through the slots in said frame members, U-shaped spring members secured to said frame members, and wing tips secured to the ends of said bar and to said spring members in the manner set forth.

3. In combination with a luggage carrier having a pair of spaced parallel frame members, a relatively rigid bar extending between said frame members and securely fastened thereto, the ends of said bar extending beyond the outer margin of said frame members, a U-shaped spring member secured to each of said frame members, bumper tips each having one end secured to one end of said bar, and each having its opposite end secured to one of said U-shaped spring members.

In testimony whereof I affix my signature.

WALTER R. MALM.